United States Patent [19]
Fukushima et al.

[11] Patent Number: 5,545,458
[45] Date of Patent: Aug. 13, 1996

[54] FOAMED PHENOLIC COMPOSITE MOLDING

[75] Inventors: Saburo Fukushima; Masaharu Yagi, both of Hyogo-ken; Kiyozi Morita; Masami Ando, both of Gunma-ken; Tokuo Saito, Hyogo-ken, all of Japan

[73] Assignees: Kawasaki Heavy Industries, Ltd., Hyogo-ken; Gun-Ei Chemical Industry Co., Ltd., Gunma-ken; Nippon Techma Engineering Corp., Hyogo-ken, all of Japan

[21] Appl. No.: 297,512

[22] Filed: Aug. 29, 1994

Related U.S. Application Data

[63] Continuation of Ser. No. 869,509, Apr. 16, 1992, abandoned.

[30] Foreign Application Priority Data

Apr. 18, 1991 [JP] Japan .................. 3-114100

[51] Int. Cl.$^6$ ...................................... B32B 3/12
[52] U.S. Cl. .................. 428/117; 52/793.1; 493/966
[58] Field of Search ........................ 428/116, 117; 52/793.1; 493/966

[56] References Cited

U.S. PATENT DOCUMENTS

| | | | |
|---|---|---|---|
| 2,839,442 | 6/1958 | Whitaker | 428/116 X |
| 3,317,074 | 5/1967 | Barker, Jr. et al. | 428/117 X |
| 3,644,158 | 2/1972 | Strumbos | 428/117 X |
| 3,695,968 | 10/1972 | Morrison | 428/117 X |
| 4,162,341 | 7/1979 | Norton | 428/117 |

*Primary Examiner*—Henry F. Epstein
*Attorney, Agent, or Firm*—Wenderoth, Lind & Ponack

[57] ABSTRACT

A foamed phenolic molding composed of a core made of a kraft paper honey comb structure consisting of plate and corrugate members impregnated with a phenolic resin; and expandable phenolic composites laminated to said core, wherein the expandable phenolic composites are made of a matted fiber material formed in the shape of a plate to which phenolic resin is bonded to at least one thereof. The expandable phenolic composites and core are molded such that the expandable phenolic material fills the cells of the kraft paper honey comb structure. The molding has excellent thermal insulation and sound insulating properties as well as high strength as compared to conventional cores without sacrificing to the lightweight characteristics and workability of the quadratic surfaces.

4 Claims, 1 Drawing Sheet

FOAMED PHENOLIC COMPOSITE MOLDING

This application is a continuation of now abandoned application Ser. No. 07/869,509, filed Apr. 16, 1992.

BACKGROUND OF THE INVENTION

1. Field of the Invention

This invention relates to a foamed phenolic composite molding which can be used, as interior materials, and cores of doors and floors, for example.

2. Prior Art

Conventionally, for the cores of the doors and floors of certain type of vehicles, corrugated cores made of aluminum have been used to reduce the weight and, to reduce the cost, paper corrugated cores impregnated with phenolic resin have been adopted.

The Verticell Paper Honeycomb (trademark) manufactured by the Verticell Corporation, a company in U.S.A., is a paper honeycomb which has been conventionally used. The Verticell Paper Honeycomb has solved the problems of corrosion and high cost associated with the conventional aluminum honeycombs. In addition, when flat sheets and corrugated members are employed, the Verticell Honeycomb can also be used for such applications as doors having quadratic surfaces by bending the corrugated core itself with the sheet members serving as the skeleton (conventionally, SUS (stainless steel) and steel materials have been used as skeleton). Thus, conventionally, the Verticell Paper Honeycomb has met the requirements in respect to the economics, lightweight materials, thermal insulation properties, and corrosion resistance.

However, there has recently been a demand for improvement in energy savings and livability, and it has been desirable to develop a molding having improved thermal insulation properties and better sound insulating properties on the basis of the above-stated conventional molding, without sacrificing the lightweight and the workability for quadratic surfaces.

SUMMARY OF THE INVENTION

This invention is provided in consideration of the above-stated situation, and intends to offer a foamed phenolic composite molding having excellent thermal insulation properties and sound insulating properties and a high strength without sacrificing the lightweight and the workability for the quadratic surfaces.

The foamed phenolic composite molding 1 of this invention (see FIG. 1) is produced by laminating the expandable phenolic composites 4 each consisting of the matted fiber material 2 formed in the shape of a sheet to at least one surface of which the expandable phenolic material 3 is bonded, and a kraft paper corrugated core structure 5 consisting of plate and corrugated members and sheets defining cells of the corrugated core structure for use as a core that is impregnated with phenolic resin, and molding these arranged so that the said expandable phenolic material 3 can fill the cells of the said kraft paper corrugated core structure 5. This invention configured as described above, can provide a foamed phenolic composite molding which has good thermal insulation properties and sound insulating properties, the cells of the kraft paper corrugated core structure 5 being filled with the expandable phenolic material 3; is provided with a high strength by the kraft paper corrugated core structure 5 impregnated with phenolic resin; and is lightweight as a whole.

DETAILED DESCRIPTION OF THE INVENTION

The foamed phenolic composite molding of this invention is produced by laminating expandable phenolic composites each consisting of a matted fiber material formed in the shape of a plate to at least one surface of which an expandable phenolic material is bonded, and a kraft paper corrugated core structure consisting of plate and corrugated members for use as core that is impregnated with phenolic resin, and molding these with these being arranged so that the said expandable phenolic material can fill the cells of the said kraft paper corrugated core structure.

The said expandable phenolic composite is formed by spreading the expandable phenolic material on at least one surface of the organic matted fiber material or inorganic material and heating it for fusion bonding to the surface. The said kraft paper corrugated core structure used is impregnated with phenolic resin in an amount of 10 to 35%. It is advantageous that the expandable phenolic composites are laminated so that they sandwich the kraft paper corrugated core structure.

The function of the foamed phenolic composite molding configured as stated above will now be described.

As a said kraft paper corrugated core structure, the Verticell Paper Honeycomb (trademark), a paper corrugated manufactured by the Verticell Corporation, a company in U.S.A., is used, for example.

The Verticell Paper Honeycomb kraft paper corrugated core structure is produced by impregnating a kraft paper corrugated core structure having cells of ¼ to ⅜ inches in size with a phenolic resin of from 10 to 20% in general and 35% at maximum, based on the final weight.

Figure 3:
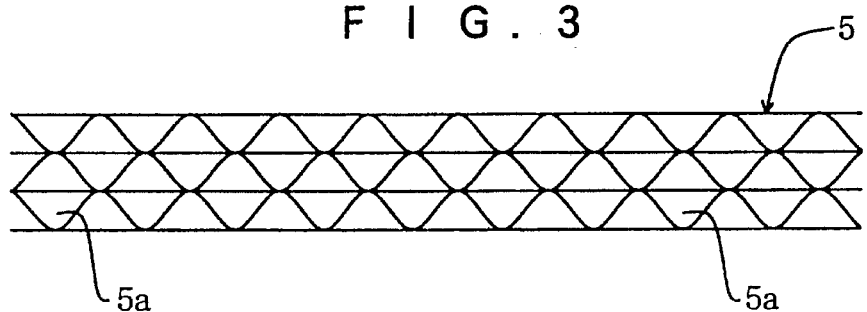
FIG. 3 is a plan view of the kraft paper corrugated core structure the embodiment of this invention.

The said kraft paper corrugated core structure has, among other properties, high mechanical strength, excellent non-flammability and moisture barrier properties, and resistance to fungi and vermin. Thus, while general paper honeycomb structures cannot be used as the structural member, the said kraft paper corrugated core structure can be used as the structural member, because it is constructed as shown in FIG. 3, resulting in that the flat spaced parallel flat sheets 5c plate members 5d therebetween and defining cells 5a, the structure being forming the ends serve as the strength elements.

Conventional honeycombs, such as aluminum honeycombs, cannot be bent without being shaped into a saddle-like configuration, thus, they cannot be provided with a quadratic surface. Contrarily, the said kraft paper corrugated core structure can easily be provided with a quadratic surface by bending it, thus, having an advantage in that it can be used for a wider variety of applications.

Because the said kraft paper corrugated core structure is impregnated with phenolic resin, it has a good affinity to the expandable phenolic material in the expandable phenolic composite, resulting in still more positive bonding of these materials to each other.

Therefore, laminating the said expandable phenolic composites and the said kraft paper corrugated core structure for molding can provide a foamed phenolic composite molding having a higher strength, and more excellent sound insulating properties and thermal insulation properties than conventional cores without sacrificing the lightweight and the workability for quadratic surfaces.

In addition to the above-stated functions, the cells of the said kraft paper corrugated core structure are filled with the expandable phenolic material which is spread on at least one surface of the organic matted fiber material or inorganic materials for fusion bonding to the surface, therefore, a foamed phenolic composite molding which is lightweight and excellent in heat insulating produced properties can be provided.

Below is a detailed description of a preferred embodiment of this invention.

Figure 1:
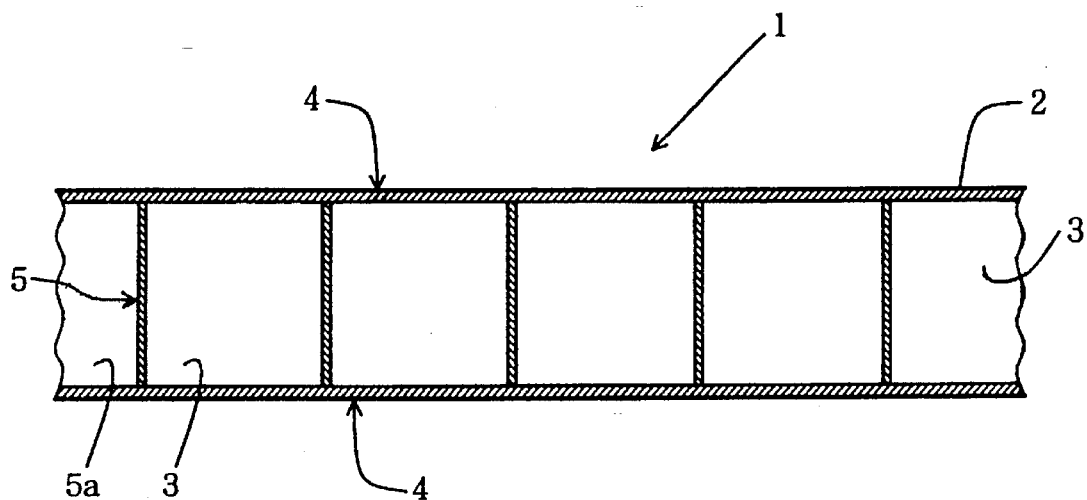
FIG. 1 is an enlarged longitudinal section of a foamed phenolic composite molding which is an embodiment of this invention.

The foamed phenolic composite molding 1 as shown in FIG. 1 is produced by laminating the expandable phenolic composites 4 each consisting of the matted fiber material 2 formed in the shape of a plate to at least one surface of which the expandable phenolic material 3 is bonded, and the kraft paper corrugated core structure 5 consisting of plate spaced parallel flat sheets 5c and corrugated members 5d therebetween and defining cells 5a, the structure being for use as a core (see FIG. 3) that is impregnated with phenolic resin, and molding these parts arranged such that the said expandable phenolic material 3 can fill the cells 5a of the said kraft paper corrugated core structure 5.

The said expandable phenolic composite 4 is formed by spreading the expandable phenolic material 3 on at least one surface of the organic or inorganic matted fiber material 2 and heating it for fusion bonding to the surface. The said kraft paper corrugated core structure 5 for use as core as shown in FIG. 3 is produced by impregnating a kraft paper corrugated core structure having cells 5a of ¼ to ⅜ inches in size with phenolic resin from 10 to 20% in general and approx. 35% at maximum of the finished weight.

Figure 2:
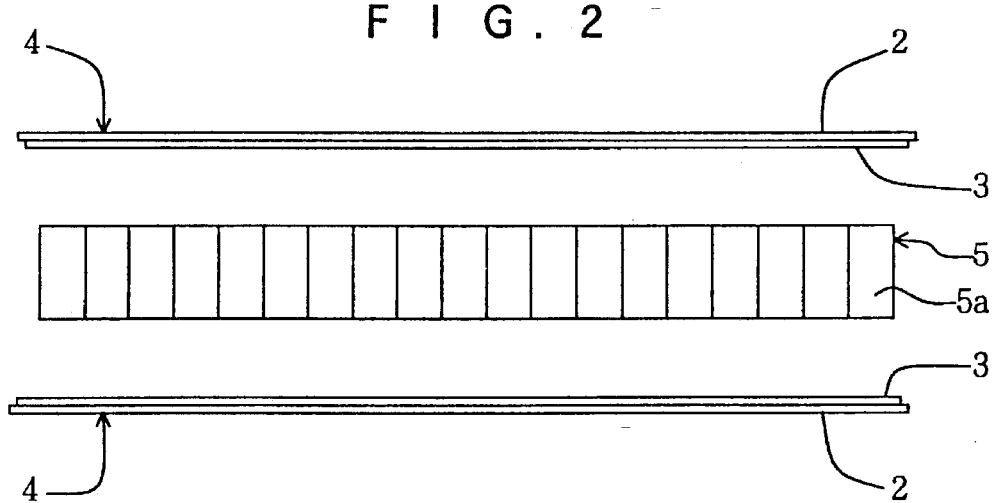
FIG. 2 is a process of manufacturing of the foamed phenolic composite molding of the present invention.

As shown in FIG. 2, the said foamed phenolic composite molding 1 is manufactured by preparing two expandable phenolic composites 4, each consisting of a matted fiber material 2 formed in the shape of a plate to at least one surface of which an expandable phenolic material 3 is uniformly bonded by foaming and curing it at a temperature of 120° C. or higher; loading them in the mold so that they are laminated to sandwich the kraft paper corrugated core structure 5; and molding them with a press with the mold temperature being held at 120° to 200° C. and the pressing is carried out for a time period of 20 to 30 min.

The foamed phenolic composite molding 1, thus manufactured, has a construction with which the cells 5a of the said kraft paper corrugated core structure 5 are uniformly filled with the expandable phenolic material 3, resulting in the air in the cells 5a being confined and prevented from being convected, which improves the thermal insulation properties. In addition, the foamed phenolic composite molding 1 is composed of the kraft paper corrugated core structure 5 made of kraft paper and the expandable phenolic material 3, which is lightweight (has a specific gravity of 0.01 to 0.10), resulting in the final product being lightweight.

It is the most desirable that the said cells 5a are 100% filled with the expandable phenolic material 3, however, if the cells 5a are partially filled with it with voids being produced in them, the voids are closed by the expandable phenolic material 3, thus, the thermal insulation properties are improved.

Now some particular embodiments will be described, however, this invention is not limited to those.

EMBODIMENT 1

By using a polyester non-woven fabric (with a basis weight of 80 g/m$^2$) is used as the matted fiber material 2, laminating the expandable phenolic composites 4 on one surface of each in which an expandable phenolic material is uniformly spread (at a spreading rate of 350 g/m$^2$) and heating for fusion bonding, and a kraft paper corrugated core structure 5 made of kraft paper with a cell size of ⅜ inches, i.e., a Verticell Paper Honeycomb (the trademark, manufactured by the Verticell Corporation, a company in U.S.A.) as shown in FIG. 2, and molding these materials at a molding temperature of 170° C. for a molding time period of 6 minutes, a foamed phenolic composite molding 1 having a thickness of 21 mm as shown in FIG. 1 was obtained.

EMBODIMENT 2

By using a chopped glass mat (with a basis weight of 300 g/m$^2$) as the matted fiber material 2 with the same method as stated in the "Embodiment 1", and molding under the same conditions as stated in the "Embodiment 1", a foamed phenolic composite molding 1 having a thickness of 21 mm is obtained.

EMBODIMENT 3

By using a rayon non-woven fabric (with a basic weight of 100 g/m$^2$) as the matted fiber material 2 according to the same method as stated in the "Embodiment 1", by molding under the same conditions as stated in the "Embodiment 1", a foamed phenolic composite molding 1 having a thickness of 21 mm was provided.

COMPARISON EXAMPLE

As a comparison example, the said kraft paper corrugated core structure 5 alone was used.

The Table 1 on the next page gives the density, compression strength, bending strength, thermal conductivity, and vertically radiated sound absorbing coefficient for the moldings in the embodiments 1 to 3, and the comparison example.

TABLE 1

| Item | | Embodiment 1 | Embodiment 2 | Embodiment 3 | Comparison ex. |
|---|---|---|---|---|---|
| Density (g/cm$^3$) | | 0.08 | 0.14 | 0.09 | |
| Compression strength (kgf/cm$^2$) | | 7.3 | 11.1 | 8.4 | 5.0 |
| Bending strebgth (kgf/cm$^2$) | lngitudinal | 18.7 | 37.3 | 13.8 | 1.0 |
| | crosswise | 10.5 | 31.1 | 10.1 | 0.05 |
| Thermal conductivity (kcal/m · h · °C.) | | 0.044 | 0.054 | 0.044 | 0.066 |
| Vertically radiated sound absorbing | 125 Hz | 0.10 | — | — | 0.04 |
| | 250 Hz | 0.11 | — | — | 0.03 |
| | 500 Hz | 0.13 | — | — | 0.04 |
| | 1000 Hz | 0.15 | — | — | 0.10 |

TABLE 1-continued

| Item | | Embodiment 1 | Embodiment 2 | Embodiment 3 | Comparison ex. |
|---|---|---|---|---|---|
| coefficient | 1250 Hz | 0.14 | — | — | 0.11 |

As can be seen from the above description, this invention allows providing a foamed phenolic composite molding which is lightweight, having a high strength, low thermal conductivity, excellent thermal insulation properties, and good sound absorbing qualities.

What is claimed is:

1. A foamed phenolic molding having thermal insulating and sound insulating properties consisting essentially of a core comprising a kraft-paper corrugated core structure consisting of corrugated members and flat sheets between the corrugated members, defining cells of the corrugated core structure, said core impregnated with a phenolic resin, and expandable phenolic composites laminated to said core, said expandable phenolic composites each consisting of a matted fiber material formed in the shape of a sheet to which expandable phenolic resin is bonded to at least one surface thereof, said expandable phenolic composites and core being molded such that the expandable phenolic material fills the cells of the kraft paper corrugated core structure.

2. The foamed phenolic composite molding as in claim 1 in which the said expandable phenolic composites are laminated so that they sandwich the paper corrugated core structure consisting of a series of sheets and corrugated members.

3. The foamed phenolic composite molding as in claim 1 in which the expandable phenolic composite is formed by spreading the expandable phenolic material on at least one surface of an organic matted fiber or inorganic matted fiber material and heating it to fuse bond it to the surface thereof.

4. The foamed phenolic composite molding as in claim 1 in which the said kraft paper corrugated core structure is impregnated with from 10 to 35% of phenolic resin.

* * * * *